United States Patent
Takeuchi

(10) Patent No.: US 10,626,948 B2
(45) Date of Patent: Apr. 21, 2020

(54) DAMPER

(71) Applicant: KYB Corporation, Tokyo (JP)

(72) Inventor: Hideaki Takeuchi, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/309,039

(22) PCT Filed: May 14, 2015

(86) PCT No.: PCT/JP2015/063930
§ 371 (c)(1),
(2) Date: Nov. 4, 2016

(87) PCT Pub. No.: WO2015/178286
PCT Pub. Date: Nov. 26, 2015

(65) Prior Publication Data
US 2017/0074344 A1    Mar. 16, 2017

(30) Foreign Application Priority Data

May 19, 2014 (JP) ................................. 2014-103012

(51) Int. Cl.
| F16F 9/36 | (2006.01) |
| F16F 9/32 | (2006.01) |
| F16F 9/06 | (2006.01) |

(52) U.S. Cl.
CPC ............. F16F 9/362 (2013.01); F16F 9/32 (2013.01); F16F 9/061 (2013.01)

(58) Field of Classification Search
CPC .... F16F 9/32; F16F 9/362; F16F 9/061; F16F 9/363; F16F 13/04; F16F 2230/30; F16F 2224/0291; F16F 2222/12; F16F 2232/08; F16J 15/3204; F16J 15/3232
USPC ............ 188/322.17; 277/908–909, 551, 549; 267/220
See application file for complete search history.

(56) References Cited

U.S. PATENT DOCUMENTS

| 3,788,630 A | * | 1/1974 | Koller | F16F 9/362 |
| | | | | 267/64.28 |
| 3,837,445 A | * | 9/1974 | Pierle | F16F 9/3484 |
| | | | | 188/322.15 |
| 4,055,352 A | * | 10/1977 | Allinquant | F16F 9/364 |
| | | | | 277/558 |

(Continued)

FOREIGN PATENT DOCUMENTS

| CN | 1824968 A | 8/2006 |
| DE | 3018215 A1 | 11/1981 |

(Continued)

*Primary Examiner* — Robert A. Siconolfi
*Assistant Examiner* — San M Aung
(74) *Attorney, Agent, or Firm* — Rabin & Berdo, P.C.

(57) ABSTRACT

A damper includes a tubular member that internally forms an action chamber, an annular rod guide secured to one side opening of the tubular member, a rod inserted through an inside of the rod guide so as to be axially movable, an oil seal installed to the action chamber side of the rod guide and seal an outer periphery of the rod, and a sealing member stacked on a side of the rod guide opposite to the action chamber, wherein the sealing member includes a dust seal that seals the outer periphery of the rod, and an outer peripheral seal that seals a gap between the tubular member and the rod guide.

10 Claims, 5 Drawing Sheets

(56) References Cited

U.S. PATENT DOCUMENTS

| | | | | |
|---|---|---|---|---|
| 4,166,523 A * | 9/1979 | Fujii | ................. | F16F 9/18 188/322.17 |
| 4,482,036 A * | 11/1984 | Wossner | ................. | F16F 9/364 188/322.13 |
| 5,115,892 A * | 5/1992 | Yamaoka | ................. | F16F 9/364 188/280 |
| 6,105,739 A * | 8/2000 | Deppert | ................. | F16J 15/3224 188/322.17 |
| 8,109,491 B2 * | 2/2012 | Handke | ................. | F16F 9/585 188/266 |
| 2002/0092722 A1 * | 7/2002 | Hosoda | ................. | F16F 9/364 188/322.17 |
| 2006/0185952 A1 * | 8/2006 | Kojima | ................. | F16F 9/362 188/322.17 |
| 2007/0052180 A1 * | 3/2007 | Watanabe | ................. | F16J 15/322 277/551 |
| 2007/0194538 A1 * | 8/2007 | Munekata | ................. | F16F 9/362 277/551 |
| 2008/0309016 A1 | 12/2008 | Ozawa et al. | | |
| 2009/0108537 A1 * | 4/2009 | Murakami | ................. | F16F 9/363 277/549 |
| 2009/0152779 A1 * | 6/2009 | Imoto | ................. | F16F 9/36 267/129 |
| 2014/0202809 A1 * | 7/2014 | Ozaki | ................. | F16F 9/36 188/322.17 |

FOREIGN PATENT DOCUMENTS

| | | |
|---|---|---|
| EP | 2647890 A2 * | 10/2013 |
| JP | H03115233 U | 11/1991 |
| JP | 2007-278459 A | 10/2007 |
| JP | 2008-309263 A | 12/2008 |

* cited by examiner

DAMPER

TECHNICAL FIELD

The present invention relates to a damper.

BACKGROUND ART

A damper is used to damp vibrations of, for example, a vehicle, a device, and a construction. For example, a damper disclosed in FIG. 3 in DE3018215A1 includes a cylinder, an annular rod guide, a rod, an annular oil seal, and an annular outer peripheral seal. The cylinder internally forms an action chamber. The rod guide is secured to an upper opening of this cylinder. The rod is inserted through an inside of the rod guide so as to be axially movable. The oil seal is installed to a lower side of the rod guide. The outer peripheral seal is fitted to an annular groove formed on an outer periphery of the rod guide. The oil seal seals an outer periphery of the rod. The outer peripheral seal seals between the rod guide and the cylinder. This prevents a fluid in the action chamber from leaking to an external air side.

SUMMARY OF INVENTION

The conventional damper includes the oil seal on the lower side, the action chamber side of the rod guide. Therefore, a foreign matter from the external air side is difficult to reach the oil seal, thereby ensuring restraining a damage of the oil seal. However, in the case where a dust seal to prevent a mixture of a foreign matter is installed to an upper side of the rod guide in addition to the conventional damper configuration, the number of components increases, making assembly work complicated. In the conventional configuration, to cover a rod insertion side opening on a tubular member such as the cylinder in the damper, the oil seal, the dust seal, and the outer peripheral seal need to be individually attached. This increases the number of attachments, making the assembly work complicated.

Furthermore, in the conventional damper, to install the outer peripheral seal, an annular groove with U shape in cross section needs to be formed on an outer periphery of the rod guide. This makes a shape of the rod guide complicated, increasing a processing cost for the rod guide.

An object of the present invention is to provide a damper that ensures simplifying assembly work and reducing a processing cost for a rod guide even in the case where the damper includes an oil seal on an action chamber side of the rod guide, a dust seal on a side of the rod guide opposite to the action chamber, and further an outer peripheral seal.

A damper according to one aspect of the present invention, includes a tubular member that internally forms an action chamber, an annular rod guide secured to one side opening of the tubular member, a rod inserted through an inside of the rod guide so as to be axially movable, an oil seal installed to the action chamber side of the rod guide and seal an outer periphery of the rod, and a sealing member stacked on a side of the rod guide opposite to the action chamber. The sealing member includes a dust seal that seals the outer periphery of the rod; and an outer peripheral seal that seals a gap between the tubular member and the rod guide.

DESCRIPTION OF EMBODIMENTS

Figure 1:
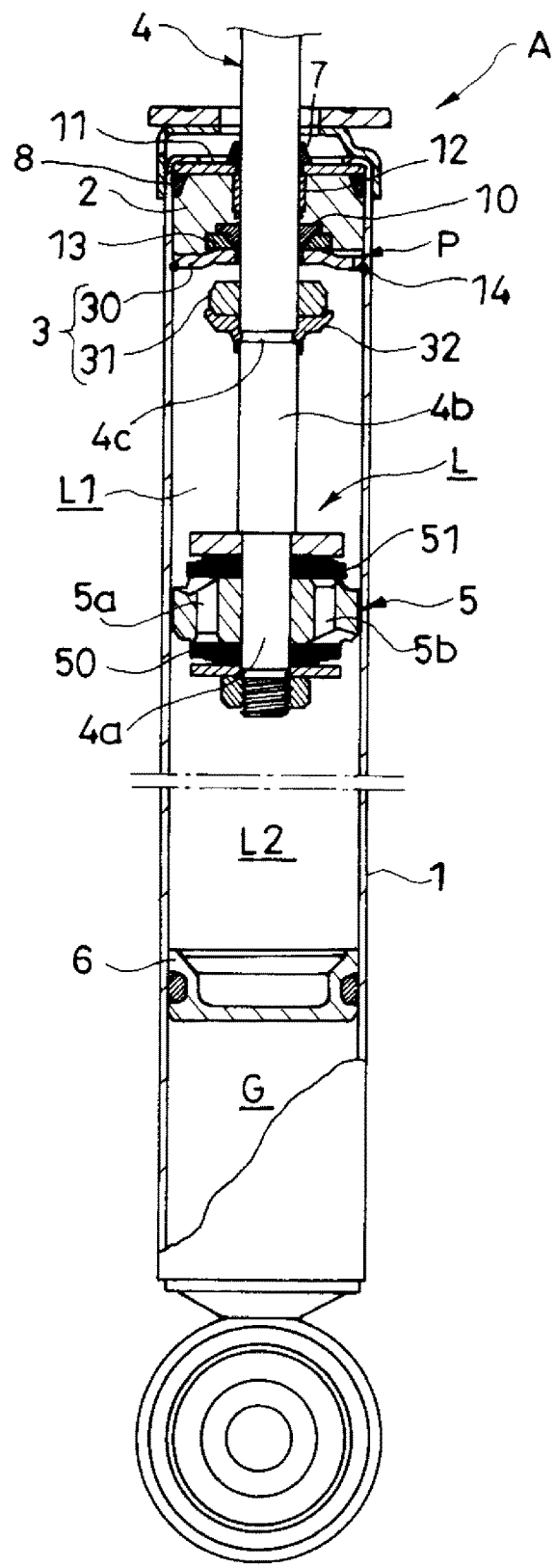
FIG. 1 is a front view illustrating partially cut damper according to an embodiment of the present invention.

The following describes a damper according to an embodiment of the present invention with reference to the drawings. Like reference numerals designate corresponding or identical elements throughout some drawings.

Figure 2:
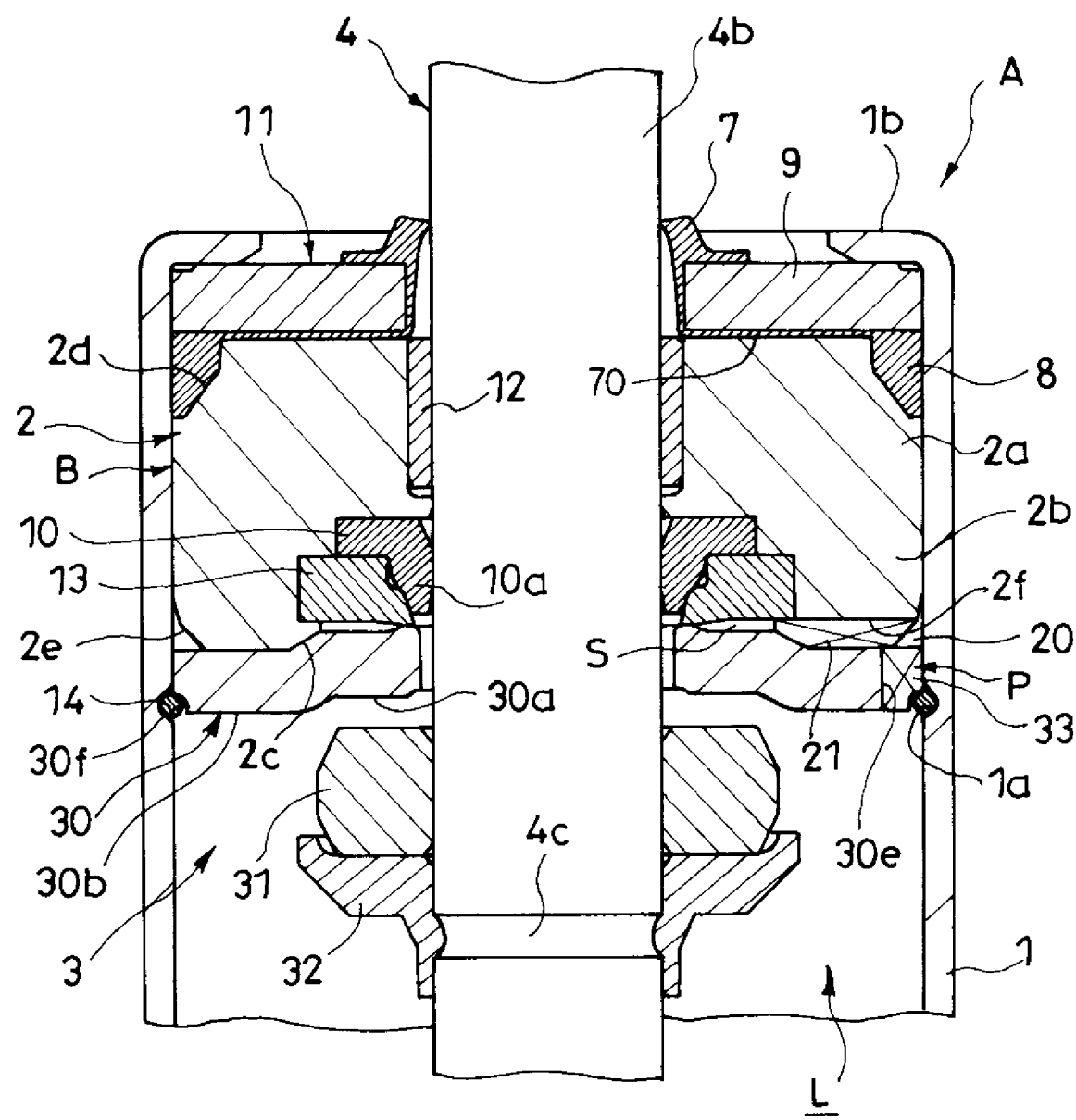
FIG. 2 is a drawing illustrating enlarged main parts in FIG. 1.

As illustrated in FIG. 1 and FIG. 2, a damper A according to the embodiment includes a cylinder (a tubular member) 1, an annular rod guide 2, a rod 4, an oil seal 10, and a sealing member 11. The cylinder 1 internally forms an action chamber L. The rod guide 2 is secured to one side opening of this cylinder 1. The rod 4 is inserted through an inside of the rod guide 2 so as to be axially movable. The oil seal 10 is installed to the action chamber L side of the rod guide 2 to seal an outer periphery of the rod 4. The sealing member 11 is stacked on an opposite side of the rod guide 2 to the action chamber L. The sealing member 11 includes a dust seal 7 and an outer peripheral seal 8. The dust seal 7 seals an outer periphery of the rod 4. The outer peripheral seal 8 seals a gap between the cylinder 1 and the rod guide 2.

The following gives the description in detail. The damper A according to the embodiment is used for a vehicle such as an automobile. The cylinder 1 is coupled to a wheel side, and a projecting end portion of the rod 4, which projects from the cylinder 1, is coupled to a vehicle body side, thus the damper A is configured to erect. Accordingly, when an impact due to uneven road surface is input to the wheel, the rod 4 moves into and out of the cylinder 1, thus the damper A extends and contracts. It should be noted that, the damper A may be used for a vehicle other than the automobile, a device, a construction, and a similar structure. The damper A may be configured to stand upside-down where the cylinder 1 is coupled to the vehicle body side and the rod 4 is coupled to the wheel side.

As illustrated in FIG. 1, the damper A according to the embodiment includes the cylinder 1, the annular rod guide 2, the rod 4, a piston 5, a free piston 6, and a rebound member 3. The cylinder 1 is formed into a shape of a cylinder with a closed bottom. The rod guide 2 is secured to an upper opening of this cylinder 1. The rod 4 penetrates the rod guide 2 and moves into and out of the cylinder 1. The piston 5 is held to a lower end portion of the rod 4 and slidably in contact with an inner peripheral surface of the cylinder 1. The free piston 6 is slidably in contact with an inner peripheral surface on a side opposite from the rod on the cylinder 1. The rebound member 3 reduces an impact while the damper A extends the most. The cylinder 1 internally includes the action chamber L filled with hydraulic oil and a gas chamber G. The action chamber L and the free piston 6 partition the gas chamber G to seal gas in the gas chamber G.

The gas chamber G swells and contracts through a movement of the free piston 6 in an axial (vertical) direction. This can compensate for a change in an inner volume of the cylinder by a volume of an appearance of the rod in association with extending and contracting the damper A and a change in volume of the hydraulic oil due to temperature change. During the extension operation of the damper A where the rod 4 moves out of the cylinder 1, the free piston 6 moves upward and the gas chamber G enlarges. This ensures compensating for an increase in cylinder inner volume by the volume of the rod moving out with the gas chamber G. During the compression operation of the damper A where the rod 4 moves into the cylinder 1, the free piston 6 moves downward and the gas chamber G contracts. This ensures compensating for the reduction in cylinder inner volume by the volume of the rod 4 moving into with the gas chamber G. In the case where the volume of hydraulic oil expands due to a temperature rise, the free piston 6 moves downward and the gas chamber G contracts. In the case where the volume of hydraulic oil contracts due to a temperature reduction, the free piston 6 moves upward and the gas chamber G enlarges.

It should be noted that, the damper A according to the embodiment includes the gas chamber G configured to be a mono-tube type. However, instead of the gas chamber G, a reservoir may be disposed outside the cylinder 1 to seal the hydraulic oil and the gas, and the reservoir may compensate for the change in cylinder inner volume and the change in volume of the hydraulic oil. In this case, an outer pipe is disposed on an outer periphery of the cylinder 1 to configure the damper A as a twin-tube type, and the reservoir is formed between the cylinder 1 and the outer pipe. Thus, with the damper A configured as the twin-tube type, the outer peripheral seal 8 may seal between the outer pipe and the rod guide 2. The liquid filling the action chamber L may be other than the hydraulic oil. As long as a damping force can be generated, the liquid can be appropriately changed.

The piston 5 partitions the action chamber L into an extension-side chamber L1 on the rod 4 side and a contraction-side chamber L2 on the piston 5 side. The piston 5 forms an extension-side passage 5a and a contraction-side passage 5b, which communicate between the extension-side chamber L1 and the contraction-side chamber L2. A leaf valve 50 to open and close the extension-side passage 5a is stacked on a lower side of the piston 5. A leaf valve 51 to open and close the contraction-side passage 5b is stacked on an upper side of the piston 5. The leaf valve 50 on the lower side functions as an extension-side damping valve that opens the extension-side passage 5a only during the extension operation of the damper A and provides a resistance to a flow of the hydraulic oil passing through this extension-side passage 5a. The leaf valve 51 on the upper side functions as a contraction-side damping valve that opens the contraction-side passage 5b only during the compression operation of the damper A and provides a resistance to a flow of the hydraulic oil passing through this contraction-side passage 5b.

With the configuration, during the extension operation of the damper A, the hydraulic oil in the contracted extension-side chamber L1 opens the leaf valve 50 on the lower side, passes through the extension-side passage 5a, and moves to the enlarged contraction-side chamber L2. Accordingly, the damper A generates an extension-side damping force caused by the resistance of the leaf valve 50 when the hydraulic oil passes through the extension-side passage 5a. Inversely, during the compression operation of the damper A, the hydraulic oil in the contracted contraction-side chamber L2 opens the leaf valve 51 on the upper side, passes through the contraction-side passage 5b, and moves to the enlarged extension-side chamber L1. Accordingly, the damper A generates a contraction-side damping force caused by the resistance of the leaf valve 51 when the hydraulic oil passes through the contraction-side passage 5b.

It should be noted that, in the embodiment, the damper A is configured to generate the damping forces on the extension side and the contraction side caused by the resistances of the leaf valves 50 and 51. However, the configuration to provide the resistance to the flow of the hydraulic oil moving between the extension-side chamber L1 and the contraction-side chamber L2 can be appropriately changed. For example, poppet valves, orifices, and similar members may substitute for the leaf valves 50 and 51. Since the leaf valve 50, which generates the damping force on the extension side, and the leaf valve 51, which generates the damping force on the contraction side, are separated, this allows individually setting the damping forces on the extension side and the contraction side. However, one valve may be configured to generate the damping forces both on the extension side and the contraction side.

The rod 4 coupled to the piston 5 includes an installation portion 4a and a shaft portion 4b. The installation portion 4a with small diameter holds the piston 5 to its outer periphery. The shaft portion 4b extends upward from this installation portion 4a, penetrates the extension-side chamber L1, and projects to the outside of the cylinder 1. An annular groove 4c is formed on an outer periphery of the shaft portion 4b, which is disposed inside the cylinder 1, along a circumferential direction. An annular stopper 32 fitted to this groove 4c supports an annular rebound cushion 31, which constitutes the rebound member 3 together with a seat 30, which will be described later. This rebound cushion 31 is made of an elastic body such as rubber. The rebound cushion 31 bumps against the seat 30 when the damper A extends the most and elastically deforms to reduce an impact during the most extension.

The shaft portion 4b of the rod 4 penetrates the annular rod guide 2 secured to the upper opening of the cylinder 1. As illustrated in FIG. 2, this rod guide 2 includes an annular main body 2a, an annular case 2b, and arc-shaped claws 2c. The case 2b is continuous with the lower side of this main body 2a. The claw 2c projects out from an inner periphery of the lower end portion of this case 2b toward a center side. A shape of the upper portion of the main body 2a is an approximately truncated cone shape. On the upper portion of the main body 2a, an inclined surface 2d inclined such that the diameter of the outer periphery gradually decreases toward the upper end is formed. A shape of the lower portion of the case 2b is an inverted truncated cone shape. On the lower portion of the case 2b, an inclined surface 2e that inclines such that the diameter of the outer periphery gradually decreases toward the lower end and inclines in the inverse direction to the inclined surface 2d is formed. Furthermore, at a lower portion of the case 2b, a bottom groove 2f is formed along the radial direction from the outer peripheral end to the inner peripheral end. This bottom groove 2f opens to a clearance between the claws 2c.

The sealing member 11 to seal the outer periphery of the rod 4 and the inner periphery of the cylinder 1 is stacked on the upper side of the main body 2a in the rod guide 2. An annular bearing 12 is fitted to the inner periphery of the main body 2a to movably support the rod 4 in the axial direction. To the inner periphery of the case 2b, the oil seal 10 to seal an outer periphery of the rod 4 and a seal holder 13 are held. The annular seat 30 is stacked on the lower side of the case 2b.

Both the oil seal 10 and the seal holder 13 are made of an elastic body such as rubber. The oil seal 10 is inserted into the case 2b, and then the seal holder 13 is fitted to the upper side of the claws 2c while being elastically deformed. This retains the oil seal 10 and the seal holder 13 with the claws 2c. Since the bearing 12 is fitted to the main body 2a to be held by this main body 2a, this ensures preliminary assembling the rod guide 2, the bearing 12, the oil seal 10, and the seal holder 13 to configure a rod guide assembly B. Accordingly, these integrated members can be attached to the cylinder 1.

A groove 1a is formed along the circumferential direction on the inner periphery of the cylinder 1. A retaining ring 14 is fitted to this groove 1a. The seat 30, the rod guide assembly B, and the sealing member 11 are stacked in this order on the upper side of the retaining ring 14, which projects from the inner peripheral surface of the cylinder 1. Crimping an upper end portion 1b of the cylinder 1 to the inside secures the stacked seat 30, rod guide assembly B, and sealing member 11 to the upper opening of the cylinder 1. Thus integrating the rod guide 2, the bearing 12, the oil seal 10, and the seal holder 13 as the rod guide assembly B ensures simplifying assembly work compared with an individual attachment of these members to the cylinder 1. It should be noted that, a method for installing the seat 30, the rod guide assembly B, and the sealing member 11 to the cylinder 1 can be appropriately changed. For example, a part corresponding to the groove 1a may be projected to the inner peripheral side by roll crimping, and the seat 30 may be hooked to this protrusion.

With the embodiment, the oil seal 10 is separated from the dust seal 7, which will be described later, and is disposed on the action chamber L side with respect to the bearing 12. In view of this, the oil seal 10 can be separated from the foreign matter from the external air side. Additionally, even if the foreign matter passes through the dust seal 7, the bearing 12 can also restrain the movement of this foreign matter to the action chamber L side. Therefore, the foreign matter is difficult to reach the oil seal 10, thus restraining a damage in the oil seal 10 by the foreign matter and ensuring improving durability of the oil seal 10. The oil seal 10 is slidably in contact with an outer peripheral surface of a part between the piston 5 and the bearing 12 in the rod 4. This part is a part less likely to deflect even if an external force acts sideways on the rod 4. Therefore, a lip portion 10a of the oil seal 10 is less likely to be separate from the outer peripheral surface of the rod 4, ensuring an excellent sealing property with the oil seal 10. Further, the oil seal 10 is separated from the dust seal 7 to be different bodies; therefore, to form these members, materials appropriate for the respective members are easily selected.

The shaft portion 4b of the rod 4 is inserted through the inside of the annular seat 30 stacked on the lower side of the case 2b. The seat 30 constitutes the rebound member 3 together with the rebound cushion 31. The seat 30 includes an annular plate-shaped butting portion 30a against which the rebound cushion 31 bumps and an annular plate-shaped seat portion 30b, which is disposed on the outer peripheral side of this butting portion 30a. On the outer peripheral portion of the seat portion 30b, a plurality of cutouts 30e are circumferentially arranged. Furthermore, a hook groove 30f hooked to the retaining ring 14 is formed at the lower portion of the seat portion 30b. The cutouts 30e are opposed to the inclined surface 2e formed on the lower outer periphery of the case 2b. A communication passage P is constituted of a vertical passage 33, an annular passage 20, a lateral passage 21, and the clearance (not indicated by reference numeral) between the claws 2c. The vertical passage 33 is formed between the cutouts 30e and the cylinder 1. The annular passage 20 is formed between the inclined surface 2e and the cylinder 1. The lateral passage 21 is formed between the bottom groove 2f and the seat portion 30b of the seat 30. In the embodiment, this communication passage P communicates between the action chamber L and a clearance S formed between the seal holder 13 and the butting portion 30a of the seat 30 to transmit a pressure in the action chamber L to the oil seal 10.

The communication passage P communicates between the clearance S, which is formed between the seal holder 13 and the seat 30, and the action chamber L. Accordingly, pressurizing the action chamber L by compressing and sealing the gas in the gas chamber G also pressurizes the clearance S. This pressure compresses the seal holder 13. This compression reduces the diameter of a supporting portion 13b of the seal holder 13 and the force of fastening the lip portion 10a of the oil seal 10 strengthens. That is, the pressure in the action chamber L is caused to act on the oil seal 10 via the communication passage P, the clearance S, and the seal holder 13 to strengthen the force of pressing the lip portion 10a of this oil seal 10 to the outer peripheral surface of the rod 4, thus ensuring enhancing the sealing property with the oil seal 10.

While this damper A extends the most, the rebound cushion 31 collides with the butting portion 30a of the seat 30 and does not overlap the cutouts 30e, which serve as the openings on the communication passage P on the action chamber L side. This does not damage the rebound cushion 31 by edges of these cutouts 30e and even if the communication passage P passes through the seat 30, this ensures enhancing the durability of the rebound cushion 31. The communication passage P includes the annular passage 20. This eliminates the need for matching positions of the bottom grooves 2f with the cutouts 30e, ensuring excellent assemblability of the damper A.

It should be noted that, the configuration of the communication passage P can be appropriately changed. The following configuration may be applicable. The bottom grooves 2f and the clearance between the claws 2c, which are formed on the identical straight line, are circumferentially disposed at regular intervals so as to uniformly apply a pressure to the seal holder 13. The shape, the number, and the arrangement of the claws 2c can be appropriately changed. For example, the claw 2c may be formed into an annular shape, and the bottom groove 2f may extend up to the inner peripheral end of the claw 2c.

The sealing member 11, which is stacked on the upper side of the main body 2a, is constituted of a metallic, annular plate-shaped insert member 9 and a rubber member 71, which coats this insert member 9. This rubber member 71 is constituted of an annular dust seal 7, the annular outer peripheral seal 8, and a coupling rubber portion 70. The dust seal 7 inclinedly extends from the inner peripheral portion of the insert member 9 to upward. The outer peripheral seal 8 extends from the outer peripheral portion of the insert member 9 to downward. The coupling rubber portion 70 covers a lower side surface of the insert member 9 and couples the dust seal 7 to the outer peripheral seal 8. The dust seal 7 is slidably in contact with the outer peripheral surface of the shaft portion 4b of the rod 4 to seal the outer periphery of the rod 4, thus preventing the foreign matter from the external air side from mixing into the cylinder 1. The outer peripheral seal 8 closely contacts the upper inclined surface 2d in the rod guide 2 and the inner peripheral surface of the cylinder 1 to prevent the hydraulic oil in the cylinder 1 from leaking to the external air side. The coupling rubber portion 70 closely contacts an upper side surface of the rod guide 2.

Figure 3A:
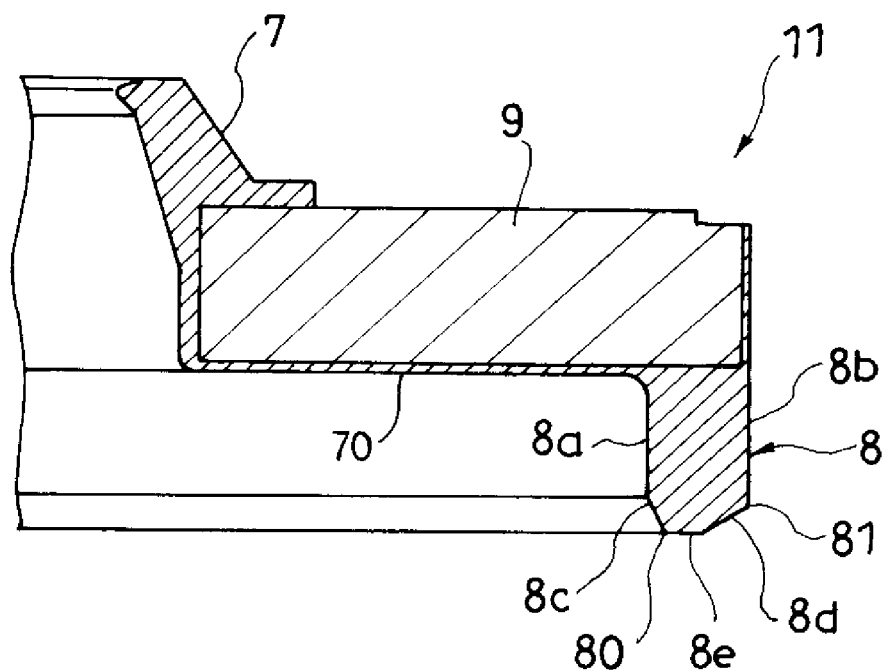
FIG. 3A is a partially enlarged view illustrating a vertical cross section of a sealing member of the damper according to the embodiment of the present invention.
Figure 3B:
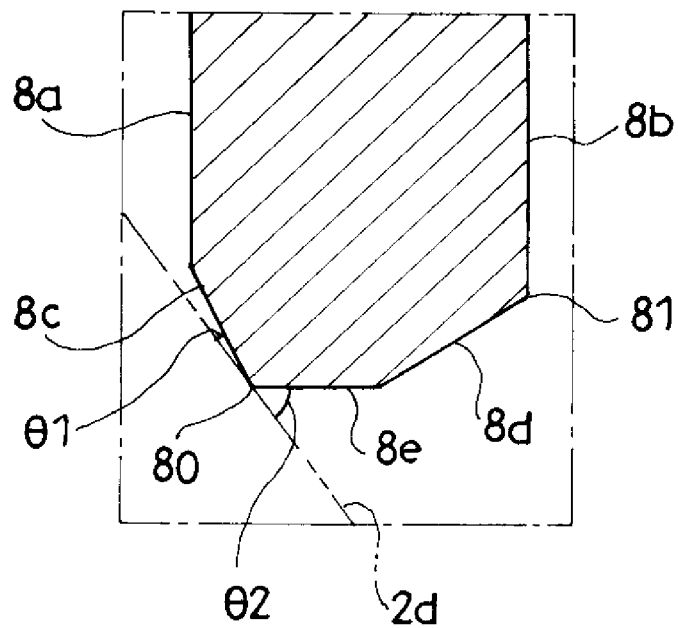
FIG. 3B illustrates an end surface view of a cut portion of a partially enlarged part of FIG. 3A.

In detail, as illustrated in FIG. 3A, the outer peripheral seal 8 has an annular inner peripheral surface 8a, an outer peripheral surface 8b, an annular first inclined surface 8c, an annular second inclined surface 8d, and an annular bottom surface 8e. The inner peripheral surface 8a and the outer peripheral surface 8b are approximately perpendicular to the insert member 9. The first inclined surface 8c gradually increases in diameter from a lower end of the inner peripheral surface 8a and extends downward. The second inclined surface 8d gradually decreases in diameter from a lower end of the outer peripheral surface 8b and extends downward. The bottom surface 8e couples a lower end on the second inclined surface 8d with a lower end on the first inclined surface 8c. A corner portion formed at a boundary part between the first inclined surface 8c and the bottom surface 8e is an inner peripheral lip 80. A corner portion formed at a boundary part between the outer peripheral surface 8b and the second inclined surface 8d is an outer peripheral lip 81. The outer peripheral lip 81 is disposed upward with respect to the inner peripheral lip 80. To attach the sealing member 11, bringing the inner peripheral lip 80 into contact with the inclined surface 2d of the rod guide 2 and pressing up the outer peripheral seal 8 presses the outer peripheral lip 81 to the inner peripheral surface of the cylinder 1.

In this embodiment, when the sealing member 11 is inserted into the cylinder 1 along the axial direction of the cylinder 1 and the inner peripheral lip 80 contacts the inclined surface 2d, which is disposed on the upper side of the rod guide 2, an angle $\theta 1$ formed by the inclined surface 2d and the first inclined surface 8c is configured to be smaller than an angle $\theta 2$ formed by the inclined surface 2d, which is disposed on the upper side of the rod guide 2, and the bottom surface 8e ($\theta 1 > \theta 2$). A volume of the outer peripheral seal 8 is configured to occupy the most part of a volume of a housing portion surrounded by the inclined surface 2d of the rod guide 2, the inner peripheral surface of the cylinder 1, and the insert member 9. Thus configuring the volume of the outer peripheral seal 8 as large as possible within a range of not exceeding the volume of the housing portion allows heightening a contact pressure while restraining a settling of the outer peripheral seal 8, thereby ensuring the excellent sealing property.

It should be noted that, the configuration of the sealing member 11 can be appropriately changed as long as the following is configured. The sealing member 11 includes the dust seal 7 and the outer peripheral seal 8. The dust seal 7 seals the outer periphery of the rod 4. The outer peripheral seal 8 can seal between the rod guide 2 and the cylinder 1.

The following describes operations of the damper A according to the embodiment.

The sealing member 11 is inserted into the cylinder 1 from the upper side of the rod guide 2, which is stacked on the seat 30 hooked to the retaining ring 14. The inner peripheral lip 80 arranged on the lower side is brought into contact with the inclined surface 2d on the upper side of the rod guide 2, and the outer peripheral seal 8 is pressed up to obliquely upward. Accordingly, the outer peripheral lip 81 is pressed to the inner peripheral surface of the cylinder 1, and a contact pressure at this part heightens, ensuring reliably sealing the inner periphery of the cylinder 1. The inner peripheral lip 80 is pressed to the inclined surface 2d, and a contact pressure at this part heightens, ensuring reliably sealing the upper side of the rod guide 2.

That is, in this embodiment, the outer peripheral seal 8 includes both the inner peripheral lip 80 and the outer peripheral lip 81. This allows preventing the movement of the hydraulic oils in two directions, heading from between the rod guide 2 and the cylinder 1 to the center side (an arrow y1 in FIG. 4) and upward (an arrow y2 in FIG. 4). This ensures reliable sealing between the rod guide 2 and the cylinder 1.

Figure 4:
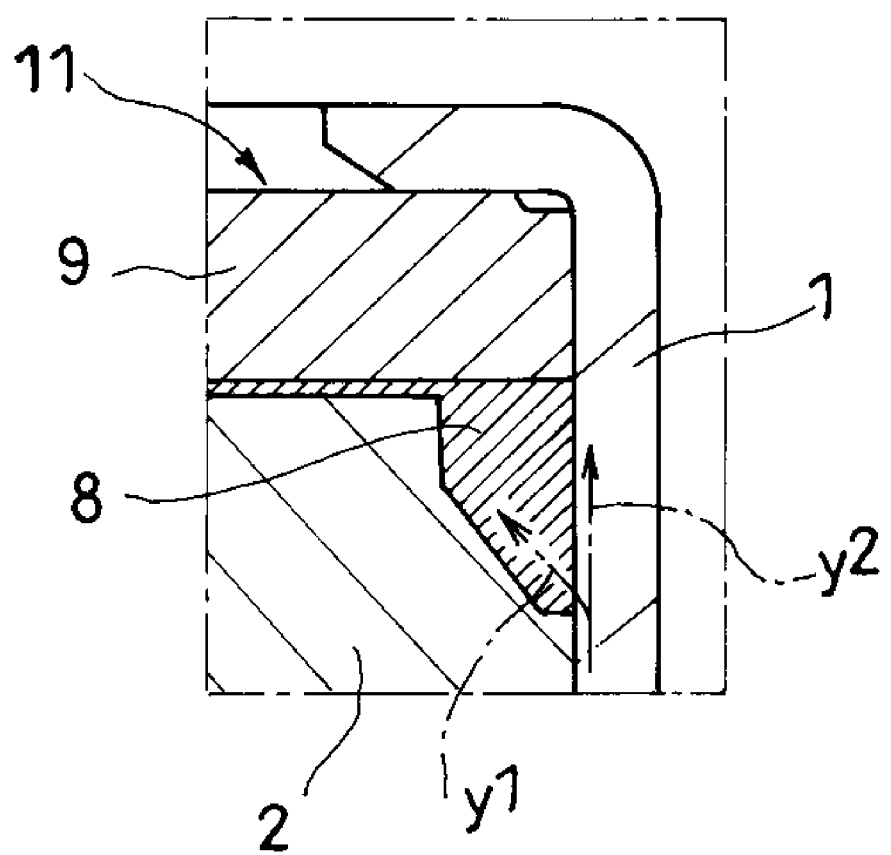
FIG. 4 is an explanatory view of a partially enlarged part of FIG. 2 illustrating a state where hydraulic oil attempts to move from between a rod guide and a cylinder to outside.

For example, FIG. 1 and FIG. 4 in DE3018215A1 disclose a damper that includes an outer peripheral seal at a sealing member. The sealing member includes both an oil seal and a dust seal and is stacked on an upper side of a rod guide. Even if the outer peripheral seal does not include an inner peripheral lip to prevent a movement of hydraulic oil heading from between the rod guide and the cylinder toward the center, this damper can prevent a leakage of the hydraulic oil with the oil seal. However, like this embodiment, to improve the sealing property of the oil seal 10, in the case where the oil seal 10 is separated from the sealing member 11 and is installed to the lower side of the rod guide 2, the outer peripheral seal 8 needs to prevent the hydraulic oil from moving from between the rod guide 2 and the cylinder 1 toward the center. Therefore, like this embodiment, providing the inner peripheral lip 80 to the outer peripheral seal 8 is effective.

In this embodiment, in a state where the outer peripheral seal 8 does not elastically deform, the outer peripheral surface 8b, the outermost side of the outer peripheral seal 8, vertically extends from the insert member 9 to the lower side, the action chamber L side. Therefore, until the inner peripheral lip 80 is brought into contact with the rod guide 2, the outer peripheral surface 8b has a shape along the inner peripheral surface of the cylinder 1. Accordingly, the outer peripheral seal 8 is easily inserted into the cylinder 1, thus ensuring preventing a damage of the outer peripheral seal 8 during the insertion.

The following describes operational advantages of the damper A according to the embodiment.

In the embodiment, the rod guide 2 retains the oil seal 10 and the seal holder 13 with the claws 2c.

Figure 5:
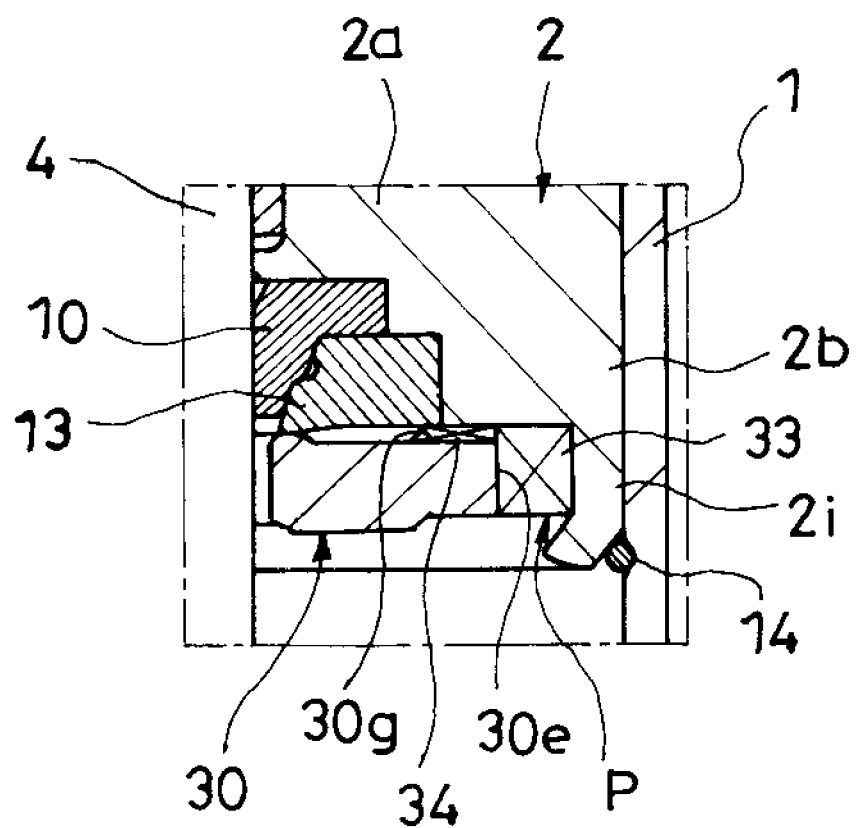
FIG. 5 illustrates a modification of the damper according to the embodiment of the present invention and is a vertical cross-sectional view illustrating the enlarged modified parts.

According to the embodiment, sliding the rod 4 can prevent the oil seal 10 from being displaced. Additionally, the rod guide 2, the oil seal 10, and the seal holder 13 can be integrated as the rod guide assembly B, easing the assembly work. It should be noted that, as illustrated in FIG. 5, the following configuration may be applicable. Dispensing with the claw 2c, an annular extending portion 2i extending from the outer periphery of the case 2b to the lower side is disposed. The oil seal 10 and the seal holder 13 are inserted into the case 2b, the seat 30 is inserted into the extending portion 2i, and the lower end of the extending portion 2i is inwardly crimped, thus integrating the rod guide 2, the oil seal 10, the seal holder 13, and the seat 30.

In the embodiment, the seat 30 is brought into contact with the rod guide 2.

The embodiment allows the rod guide 2, a strength member, to receive a load when the rebound cushion 31 is bumped against the seat 30 (hereinafter referred to as a rebound load), ensuring thinning the thickness of the seat 30. It should be noted that, the seat 30 may be separated from the rod guide 2 to receive the rebound load by the seat 30 alone. However, in this case, the seat 30 needs to be set to have a high strength so as to endure a large load. Furthermore, this needs to secure the seat 30 and the rod guide 2 individually to the cylinder 1, making the structure complicated.

In the embodiment, the inclined surface 2e is formed on the outer periphery of the rod guide 2. The diameter of the inclined surface 2e gradually decreases toward the seat 30 side end (the lower end), and the inclined surface 2e is opposed to the cutout 30e. Additionally, the bottom groove 2f is formed along the radial direction on the seat 30 side (the lower portion) of the rod guide 2. The communication passage P includes the annular passage 20, which is formed between the inclined surface 2e and the cylinder 1, and the lateral passage 21, which is formed between the bottom grooves 2f and the seat 30.

With the embodiment, even if the positions of the cutouts 30e and the bottom grooves 2f are not matched, the vertical passage 33, which is formed with the cutout 30e, can communicate with the lateral passage 21, which is formed between the bottom grooves 2f and the seat 30, via the annular passage 20, ensuring excellent assemblability of the damper A. It should be noted that, as long as the positions of the cutouts 30e and the bottom grooves 2f are matched so as to always ensure the communication between the vertical passage 33 and the lateral passage 21, the annular passage 20 can be dispensed with. Instead of the inclined surface 2e and the bottom groove 2f, the following configuration may be employed. As illustrated in FIG. 5, on the rod guide 2 side of the seat 30 (the upper portion), a lateral groove 30g extending from the cutout 30e to the center side along the radial direction is formed. The communication passage P is configured of a lateral passage 34, which is formed between this lateral groove 30g and the rod guide 2, and the vertical passage 33, which is formed of the cutout 30e.

In the embodiment, the cutout 30e is formed on the outer peripheral portion of the seat 30. The communication passage P includes the vertical passage 33 formed of the cutout 30e.

With the embodiment, the openings on the communication passage P on the action chamber L side can be close to the outer peripheral side as much as possible, thereby ensuring improving a freedom of design of the rebound cushion 31. It should be noted that, the configuration of the communication passage P and the shape of the seat 30 are not limited to the ones described above. As long as the rebound cushion 31 is configured so as not to overlap the openings on the communication passage P on the action chamber L side, the configurations can be appropriately changed.

In this embodiment, the damper A includes the communication passage P to transmit the pressure in the action chamber L to the oil seal 10. The openings on the communication passage P on the action chamber L side (the cutouts 30e) are disposed on the outer peripheral side with respect to the part (the butting portion 30a) of the seat 30 against which the rebound cushion 31 bumps.

Even in the case where the communication passage P passes through the seat 30 and the rebound cushion 31, which is installed to the outer periphery of the rod 4, bumps against the seat 30, the above-described embodiment can smooth the surface of the seat 30 receiving the rebound cushion 31 as much as possible. This restrains the damage in the rebound cushion 31, thereby ensuring enhancing the durability of the rebound cushion 31.

In this embodiment, the inner peripheral lip 80 is disposed on the action chamber L side (the lower side) with respect to the outer peripheral lip 81.

In this embodiment, when the inner peripheral lip 80 is brought into contact with the inclined surface 2d of the rod guide 2 and the outer peripheral seal 8 is pressed up to obliquely upward, the outer peripheral lip 81 can be pressed to the inner peripheral surface of the cylinder 1, and the contact pressure at this part can be heightened. The inner peripheral lip 80 is pressed to the inclined surface 2d and the contact pressure at this part heightens. That is, with the configuration, it is possible to easily press the inner peripheral lip 80 to the rod guide 2 and to easily press the outer peripheral lip 81 to the cylinder 1. It should be noted that, as long as the inner peripheral lip 80 and the outer peripheral lip 81 thus can be pressed, the arrangements and the shapes of the inner peripheral lip 80 and the outer peripheral lip 81 can be appropriately changed.

In this embodiment, the outer peripheral seal 8 includes the annular inner peripheral surface 8a and outer peripheral surface 8b, the first inclined surface 8c, the second inclined surface 8d, and the bottom surface 8e. The inner peripheral surface 8a and the outer peripheral surface 8b vertically extend from the insert member 9 to the action chamber L side (the lower side). The first inclined surface 8c extends to the action chamber L side (the lower side) with gradually increasing diameter from the action chamber L side end (the lower end) of the inner peripheral surface 8a. The second inclined surface 8d extends to the action chamber L side (the lower side) with gradually decreasing diameter from the action chamber L side end (the lower end) of the inner peripheral surface 8a. The bottom surface 8e couples the action chamber L side ends (the lower ends) of the first inclined surface 8c and the second inclined surface 8d. The inner peripheral lip 80 is the corner portion formed at the boundary part between the first inclined surface 8c and the bottom surface 8e. The outer peripheral lip 81 is the corner portion formed at the boundary part between the outer peripheral surface 8b and the second inclined surface 8d.

In this embodiment, in the state of not elastically deformed, the outer peripheral surface 8b, the outermost side of the outer peripheral seal 8, has the shape along the inner peripheral surface of the cylinder 1. Additionally, the outer peripheral lip 81 has a structure of not projecting to the outside with respect to the outer peripheral surface 8b. Therefore, to insert the outer peripheral seal 8 into the cylinder 1, the outer peripheral lip 81 is not hooked to the cylinder 1, ensuring covering a damage of the outer peripheral seal 8 during the insertion. It should be noted that, the inner peripheral lip 80 and the outer peripheral lip 81 may be formed not by the corner portions but by protrusions and similar members.

In this embodiment, the inclined surface 2d whose diameter gradually decreases toward an end of the side opposite to the action chamber (the upper end) is formed on the outer periphery of the rod guide 2. The outer peripheral seal 8 includes the inner peripheral lip 80, which is brought into contact with the inclined surface 2d, and the outer peripheral lip 81, which is brought into contact with the inner peripheral surface of the cylinder 1.

According to this embodiment, the inner peripheral lip 80 can prevent the movement of the hydraulic oil heading from between the cylinder 1 and the rod guide 2 toward the center (the arrow y1 in FIG. 4). Additionally, the outer peripheral lip 81 can prevent the movement of the hydraulic oil heading from between the cylinder 1 and the rod guide 2 to the upper side, the side opposite to the action chamber side (the arrow y2 in FIG. 4). Accordingly, the site between the cylinder 1 and the rod guide 2 can be reliably sealed. It should be noted that, as long as the site between the cylinder 1 and the rod guide 2 can be sealed, the configurations of the rod guide 2 and the outer peripheral seal 8 can be appropriately changed.

In this embodiment, the sealing member 11 is constituted of the annular plate-shaped insert member 9 and the rubber member 71, which coats the insert member 9. The rubber member 71 forms the dust seal 7 and the outer peripheral seal 8.

According to the embodiment, the dust seal 7 and the outer peripheral seal 8 can be integrated via the insert member 9. Therefore, the sealing member 11 including both the dust seal 7 and the outer peripheral seal 8 can be easily formed. It should be noted that, as long as the sealing member 11 includes the dust seal 7 and the outer peripheral seal 8, the configuration of the sealing member 11 can be appropriately changed.

The damper A according to the embodiment includes the cylinder (the tubular member) 1, the annular rod guide 2, the rod 4, the oil seal 10, and the sealing member 11. The cylinder 1 internally forms the action chamber L. The rod guide 2 is secured to one side (the upper side) opening of this cylinder 1. The rod 4 is inserted through the inside of the rod guide 2 so as to be axially movable. The oil seal 10 is installed to the action chamber L side of the rod guide 2 (the lower side) to seal the outer periphery of the rod 4. The sealing member 11 is stacked on the reaction chamber side of the rod guide 2 (the upper side). The sealing member 11 includes the dust seal 7 and the outer peripheral seal 8. The dust seal 7 seals the outer periphery of the rod 4. The outer peripheral seal 8 seals between the cylinder 1 and the rod guide 2.

According to the embodiment, the oil seal 10 is disposed on the lower side, the action chamber L side of the rod guide 2. Therefore, the foreign matter from the external air side is difficult to reach the oil seal 10, thereby ensuring restraining the damage of the oil seal 10. Further, even in the case where the oil seal 10 is disposed on the action chamber L side of the rod guide 2, the dust seal 7 is disposed on the reaction chamber side of the rod guide 2, and further the outer peripheral seal 8 is disposed, the dust seal 7 and the outer peripheral seal 8 can be integrated into one component as the sealing member 11. This reduces the number of components and the number of attachments, thereby ensuring simplifying the assembly work.

According to this embodiment, like conventional one, the annular groove with U shape in cross section, which fits the outer peripheral seal to the outer periphery of the rod guide 2, needs not to be formed, allowing the reduction in processing cost for the rod guide 2.

It should be noted that, in this embodiment, since the damper A is configured as the mono-tube type, the outer peripheral seal 8 seals between the cylinder 1 and the rod guide 2. However, with the damper A with twin-tube type, the outer peripheral seal 8 may seal between the outer pipe and the rod guide 2.

Although the embodiment of the present invention has been described above, the above embodiment is merely an illustration of one application example of the present invention and not of the nature to limit the technical scope of the present invention to the specific configuration of the above embodiment.

The present application claims a priority of Japanese Patent Application No. 2014-103012 filed with the Japan Patent Office on May 19, 2014, and all the contents of which are hereby incorporated by reference.

The invention claimed is:

1. A single-cylinder damper, comprising:
   a tubular member that internally forms an action chamber;
   a rod;
   an annular rod guide secured to one side opening of the tubular member, the annular rod guide having an action chamber side, and a side opposite to the action chamber side in an axial direction of the rod, the rod being inserted through an inside of the rod guide so as to be axially movable;
   an annular bearing fitted to an inner periphery of the rod guide at the side opposite to the action chamber side, to movably support the rod in the axial direction;
   an oil seal installed at the action chamber side of the rod guide and having an oil lip that seals an outer periphery of the rod; and
   a sealing member stacked on the side opposite to the action chamber side with the annular bearing being disposed between the oil seal and the sealing member, wherein
   the sealing member includes a rubber member that is a single continuous element that forms
      a dust seal configured to seal the outer periphery of the rod;
      an outer peripheral seal configured to seal a gap between the tubular member and the rod guide, and
      a coupling rubber portion that couples the dust seal to the outer peripheral seal.

2. The single-cylinder damper according to claim 1, wherein the sealing member includes an annular plate-shaped insert member and the coupling rubber portion is disposed between the insert member and the rod guide.

3. The single-cylinder damper according to claim 2, wherein
   an inclined surface that gradually decreases in diameter toward an end of the side opposite to the action chamber side is formed on an outer periphery of the rod guide, and the outer peripheral seal includes:
      an inner peripheral lip in contact with the inclined surface; and
      an outer peripheral lip in contact with a first inner peripheral surface of the tubular member.

4. The single-cylinder damper according to claim 3, wherein
   the outer peripheral seal includes:
      an annular second inner peripheral surface and an outer peripheral surface vertically extending from the insert member to the action chamber side;
      a first inclined surface that extends from an action chamber side end on the second inner peripheral surface to the action chamber side with a gradually increasing diameter;
      a second inclined surface that extends from the action chamber side end on the outer peripheral surface to the action chamber side with a gradually decreasing diameter; and
      a bottom surface that couples the action chamber side ends on the first inclined surface and the second inclined surface,
   the inner peripheral lip is constituted of a first corner portion formed at a boundary part between the first inclined surface and the bottom surface, and
   the outer peripheral lip is constituted of a second corner portion formed at a boundary part between the outer peripheral surface and the second inclined surface.

5. The single-cylinder damper according to claim 3, wherein the inner peripheral lip is disposed on the action chamber side relative to the outer peripheral lip.

6. The single-cylinder damper according to claim 4, wherein
   the rod guide includes another inclined surface on an outer periphery of the upper side thereof, the another inclined surface gradually increasing in diameter toward the action chamber, a first angle is formed between the another inclined surface of the rod guide and the firs inclined surface of the outer peripheral seal, and a second angle is formed between the another inclined surface of the rod guide and the bottom surface of the outer peripheral seal, the first angle being smaller than the second angle.

7. The single-cylinder damper according to claim 1, wherein the rod guide includes an annular main body, and an annular case which is continuous with a lower side of the annular main body, and the annular bearing is fitted to an inner periphery of the annular main body, and the oil seal is separated from the bearing and held in the inner periphery of the case.

8. The single-cylinder damper according to claim 2, wherein, the cupping rubber portion directly contacts to cover a surface at a side of the action chamber of the annular plate-shaped insert member.

9. A single-cylinder damper, comprising:

a tubular member that internally forms an action chamber;

a rod;

an annular rod guide secured to one side opening of the tubular member, the annular rod guide having an action chamber side, and a side opposite to the action chamber side in an axial direction of the rod, the rod being inserted through an inside of the rod guide so as to be axially movable;

an annular bearing fitted to an inner periphery of the rod guide at the side opposite to the action chamber side, to movably support the rod in the axial direction;

an oil seal installed at the action chamber side of the rod guide and sealing an outer periphery of the rod; and a sealing member stacked on the side opposite to the action chamber side with the annular bearing being disposed between the oil seal and the sealing member, wherein the sealing member includes a rubber member that is a single continuous element that forms a dust seal configured to seal the outer periphery of the rod;

an outer peripheral seal configured to seal a gap between the tubular member and the rod guide, and a coupling rubber portion that couples the dust seal to the outer peripheral seal, and wherein the oil seal is disposed below and apart from both of the dust seal and the annular bearing.

10. A single-cylinder damper, comprising:

a tubular member that internally forms an action chamber;

a rod;

an annular rod guide secured to one side opening of the tubular member, the annular rod guide having an action chamber side, and a side opposite to the action chamber side in an axial direction of the rod, the rod being inserted through an inside of the rod guide so as to be axially movable;

an annular bearing fitted to an inner periphery of the rod guide at the side opposite to the action chamber side, to movably support the rod in the axial direction;

an oil seal installed at the action chamber side of the rod guide and sealing an outer periphery of the rod; and a sealing member stacked on the side opposite to the action chamber side with the annular bearing being disposed between the oil seal and the sealing member, wherein the sealing member includes a rubber member that is a single continuous element that forms a dust seal configured to seal the outer periphery of the rod;

an outer peripheral seal configured to seal a gap between the tubular member and the rod guide, and a coupling rubber portion that couples the dust seal to the outer peripheral seal, and wherein the annular bearing is in direct contact with the sealing member.

* * * * *